(12) United States Patent
Wakamori et al.

(10) Patent No.: US 7,357,381 B2
(45) Date of Patent: Apr. 15, 2008

(54) METHOD OF MANUFACTURING SPRING ASSEMBLY

(75) Inventors: Masami Wakamori, Kanagawa (JP); Toshie Fueki, Kanagawa (JP)

(73) Assignee: Piolax, Inc, Yokohama-shi (JP)

( * ) Notice: Subject to any disclaimer, the term of this patent is extended or adjusted under 35 U.S.C. 154(b) by 1 day.

(21) Appl. No.: 10/882,090

(22) Filed: Jul. 1, 2004

(65) Prior Publication Data

US 2005/0017422 A1 Jan. 27, 2005

(30) Foreign Application Priority Data

Jul. 2, 2003 (JP) ............................ P.2003-190011

(51) Int. Cl.
*F16F 1/06* (2006.01)
(52) U.S. Cl. ...................... 267/179; 267/287; 29/512; 29/896.91
(58) Field of Classification Search ................ 267/179, 267/91, 287, 289; 29/505, 507, 512, 896.91
See application file for complete search history.

(56) References Cited

U.S. PATENT DOCUMENTS

| | | | | | |
|---|---|---|---|---|---|
| 1,466,363 | A | * | 8/1923 | Hamilton | ......................... 38/63 |
| 3,122,829 | A | * | 3/1964 | Schaad et al. | ................ 29/436 |
| 3,866,287 | A | * | 2/1975 | Dulude et al. | ........... 29/896.91 |
| 4,371,154 | A | * | 2/1983 | Winbigler | .................... 267/179 |
| 4,881,725 | A | * | 11/1989 | Shioda et al. | ................ 267/179 |
| 5,306,086 | A | * | 4/1994 | Orlowski et al. | ............. 267/89 |
| 5,772,191 | A | * | 6/1998 | Nakano et al. | ............. 267/289 |

FOREIGN PATENT DOCUMENTS

| | | |
|---|---|---|
| EP | 1 416 186 A2 | 5/2004 |
| EP | 1 416 186 A3 | 8/2004 |
| JP | 06-159418 | 6/1994 |
| JP | 6-226559 | 8/1994 |
| JP | 10-311357 | 5/1997 |
| JP | 3288458 | 3/2002 |
| JP | 2003-025165 | 1/2003 |

OTHER PUBLICATIONS

European Search Report dated Nov. 9, 2004.

* cited by examiner

*Primary Examiner*—Robert A. Siconolfi
*Assistant Examiner*—Mariano Sy
(74) *Attorney, Agent, or Firm*—McGinn IP Law Group, PLLC

(57) ABSTRACT

Large-diameter projection portions and small-diameter projection portions are formed in each of the two annular plates, while large-diameter end turn portions, which are respectively associated with large-diameter projection portions, and small-diameter end turn portions, which are respectively associated with small-diameter projection portions, are formed in the compression coil springs. Then, a punch having a diameter portion, whose diameter is larger than the inside diameter of the large-diameter projection portion, is inserted thereinto and increases the diameter thereof. Consequently, the large-diameter end turn portions of the compression coil springs are assembled to each of the annular plates. Subsequently, the punch having a portion, whose diameter is larger than the inside diameter of the small-diameter end turn portion is inserted from the inside of each of the enlarged large-diameter projection portions into the small-diameter projection portion and increases the diameter of the small-diameter projection portion.

18 Claims, 6 Drawing Sheets

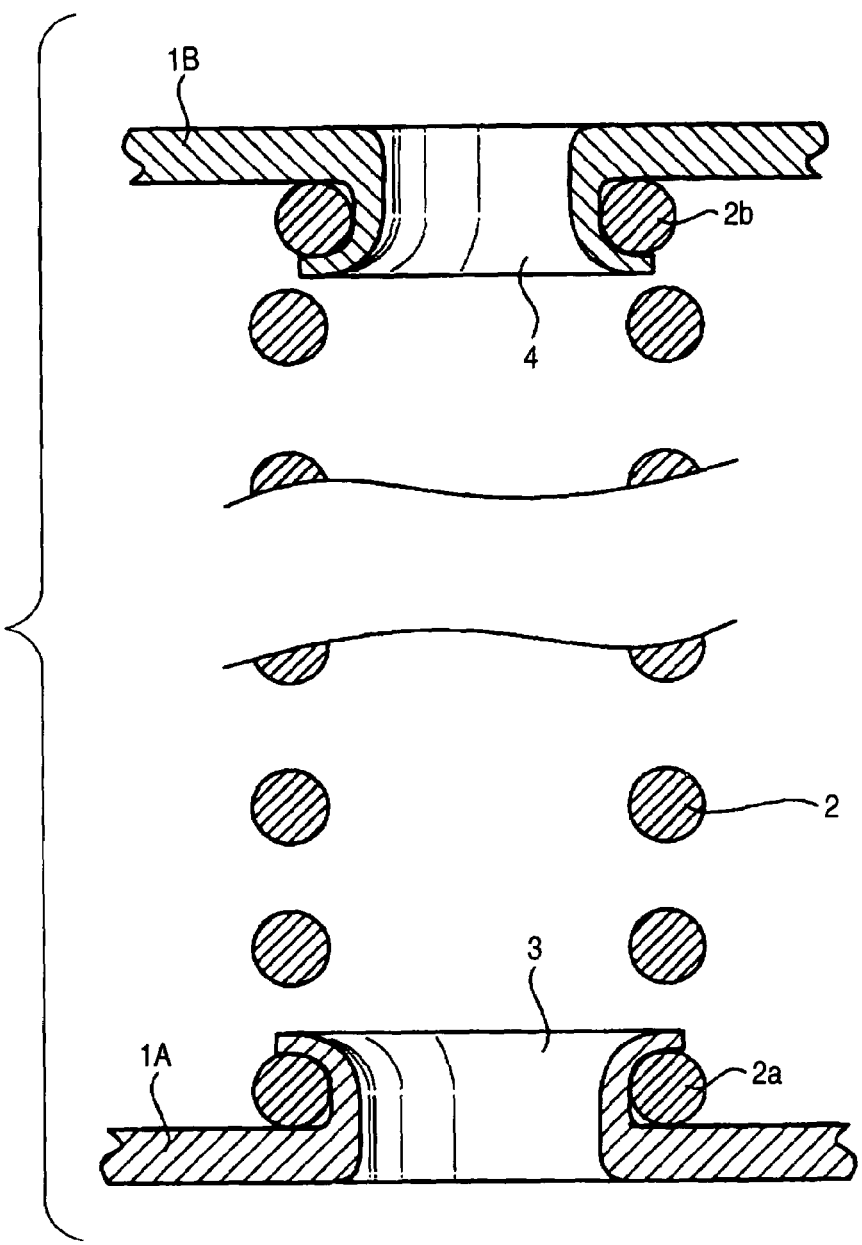

METHOD OF MANUFACTURING SPRING ASSEMBLY

BACKGROUND OF THE INVENTION

1. Field of the Invention

The present invention relates to a method of manufacturing a spring assembly to be used as, for example, a return spring means for returning a multiple disc clutch piston in a clutch mechanism of an automotive automatic transmission.

2. Description of the Related Art

This kind of related spring assembly (although not concretely shown) comprises two annular plates and plural compression coil springs interposed between these annular plates in the circumferential direction thereof at predetermined intervals. At the practical assembling thereof, a state, in which each of the end turn portions of the compression coil springs is set on the outer periphery of a projection portion formed in such a way as to face an associated one of the inner surfaces of the annular plates, is obtains. Then, each of the projection portions is outwardly enlarged in diameter by using a caulking punch. Thus, each of the end turn portions of the compression coil springs is supported by being surrounded between the outer peripheral surface of an associated one of the projection portions and the inner surface of an associated one of the annular plates.

With such a configuration, in the step of assembling a same-side one of the end turn portions of each of the compression coil springs to an associated one of the annular plates, the caulking punch can easily be made to come closer to an associated one of the projection portions. Thus, the projections can relatively easily be caulked. However, in the step of assembling the other end turn portion of each of the compression coil springs to the associated one of the annular plates, the caulking punch cannot easily be inserted into a region between the annular plates. In this case, extremely difficult and troublesome operations are forcibly performed.

Thus, hitherto, the following method has been proposed as a countermeasure thereagainst. That is, in the case of assembling a same-side one of the end turn portions of each of the compression coil springs to an associated one of the annular plates, the associated one of the projection portions is caulked by using an ordinary caulking punch as heretofore. However, in the case of assembling the other end turn portion of each of the compression coil springs to the associated one of the annular plates, caulking is performed by using a longitudinal split punch and a spreading pin.

Concretely, the longitudinally split punch has an outside diameter that is slightly smaller than the inside diameter of the projection portion. An end portion of the longitudinally split punch is split by a splitting groove in such a manner as to be able to be enlarged. The spreading pin has such an outside diameter that this pin can be inserted into the projection portion associated with the other annular plate. The end portion of the longitudinally split punch can be spread by leading the pointed end portion of the spreading pin into the splitting groove of the longitudinally split punch.

Thus, the end portion of the longitudinally split punch is inserted from the inside of the projection portion associated with one of the annular plate, which has already been caulked, and then made to descend, while the pointed end portion of the spreading pin is faced to the inside of the projection portion provided at the side of the other annular plate to be caulked. Then, the pointed end portion of the spreading pin is led into the splitting groove, so that the end portion of the longitudinally split punch is spread. Consequently, the projection portions can be outwardly spread and caulked (see, for instance, Japanese Patent No. 3288458).

Therefore, according to the related manufacturing method, the projection portion associated with the other annular plate can easily be caulked by using the longitudinally split punch and the spreading pin. Thus, an operation of assembling the other annular plate and the compression coil spring to each other is improved. However, in the case of caulking the projection portion, the projection portion is not uniformly spread over the entire circumference thereof but only partly spread at the end portion thereof, which is split through the splitting groove of the longitudinally split punch. Thus, the holding forces of the compression coil springs against the other annular plate decrease by themselves. Consequently, there is a fear that the compression coil springs may disengage therefrom. Also, the end portion of the longitudinally split punch itself is split through the splitting groove. Thus, the end portion of the longitudinally split punch is poor in strength. Consequently, there is a fear that the longitudinally split punch may easily be broken and abrade away.

SUMMARY OF THE INVENTION

The invention is developed to effectively solve the problems that such a related manufacturing method has. According to the invention, there is provided a method (hereunder referred to as a first method of the invention) of manufacturing a spring assembly, which includes two annular plates and compression coil springs, and which is adapted so that the compression coil springs are assembled to the annular plates by caulking projection portions formed on the two annular plates, respectively. This method comprising the step of forming large-diameter projection portions and small-diameter projection portions in each of the two annular plates, while forming large-diameter end turn portions, which are respectively associated with large-diameter projection portions, and small-diameter end turn portions, which are respectively associated with small-diameter projection portions, in the compression coil springs, the step of setting the large-diameter end turn portions on outer peripheries of the large-diameter projection portions, the step of inserting a punch having a portion, whose diameter is larger than the inside diameter of each of the large-diameter projection portions, thereinto and enlarging each of the large-diameter projection portions in diameter thereof to thereby assemble the large-diameter end turn portions of the compression coil springs to each of the annular plates, the step of subsequently setting the small-diameter end turn portions on outer peripheries of the large-diameter projection portions, and the step of inserting the punch having a portion, whose diameter is larger than the inside diameter of each of the small-diameter end turn portions, from the inside of each of the enlarged large-diameter projection portions thereinto and enlarging the small-diameter projection portions in diameter thereof to thereby assemble the small-diameter end turn portions of the compression coil springs to each of the annular plates.

According to an embodiment (hereunder referred to as a second method of the invention) of the first method of the invention, the two annual plates have the same shape. The large-diameter projection portions and the small-diameter projection portions of one of the annular plates are opposed to those of the other annular plate therebetween. Thus, Thus, according to the first method of the invention, the large-diameter projection portions and the small-diameter projection portions are formed in each of the two annular plates.

On the other hand, the large-diameter end turn portion, which is associated with the large-diameter projection portion, and the small-diameter end turn portion, which is associated with the small-diameter projection portion, are formed in each of the compression coil springs. Then, each of the projection portions is enlarged in diameter through the punch over the entire circumference thereof. Regarding the assembling of the large-diameter end turn portion and the small-diameter end turn portion of each of the compression coil springs to the annular plates, as compared with the related method, the end turn portions of each of the compression coil springs can reliably and firmly held. Moreover, the need for using the longitudinally split punch as used in the related method is eliminated. Consequently, the durability of a caulking tool can be enhanced very much.

In addition to this, according to the second method of the invention, the two annual plates are formed in such a way as to have the same shape. The large-diameter projection portions and the small-diameter projection portions of one of the annular plates are opposed to those of the other annular plate therebetween. Thus, the annular plates can be shared upwardly/downwardly. Consequently, the second method of the invention is extremely economical.

BRIEF DESCRIPTION OF THE DRAWINGS

These and other objects and advantages of this invention will become more fully apparent from the following detailed description taken with the accompanying drawings in which:

FIG. 6 is an explanatory view illustrating a state in which the small-diameter end turn portion of the compression coil spring portion at the small-diameter projection portion of the annular plate.

DETAILED DESCRIPTION OF THE PREFERRED EMBODIMENTS

Figure 1:
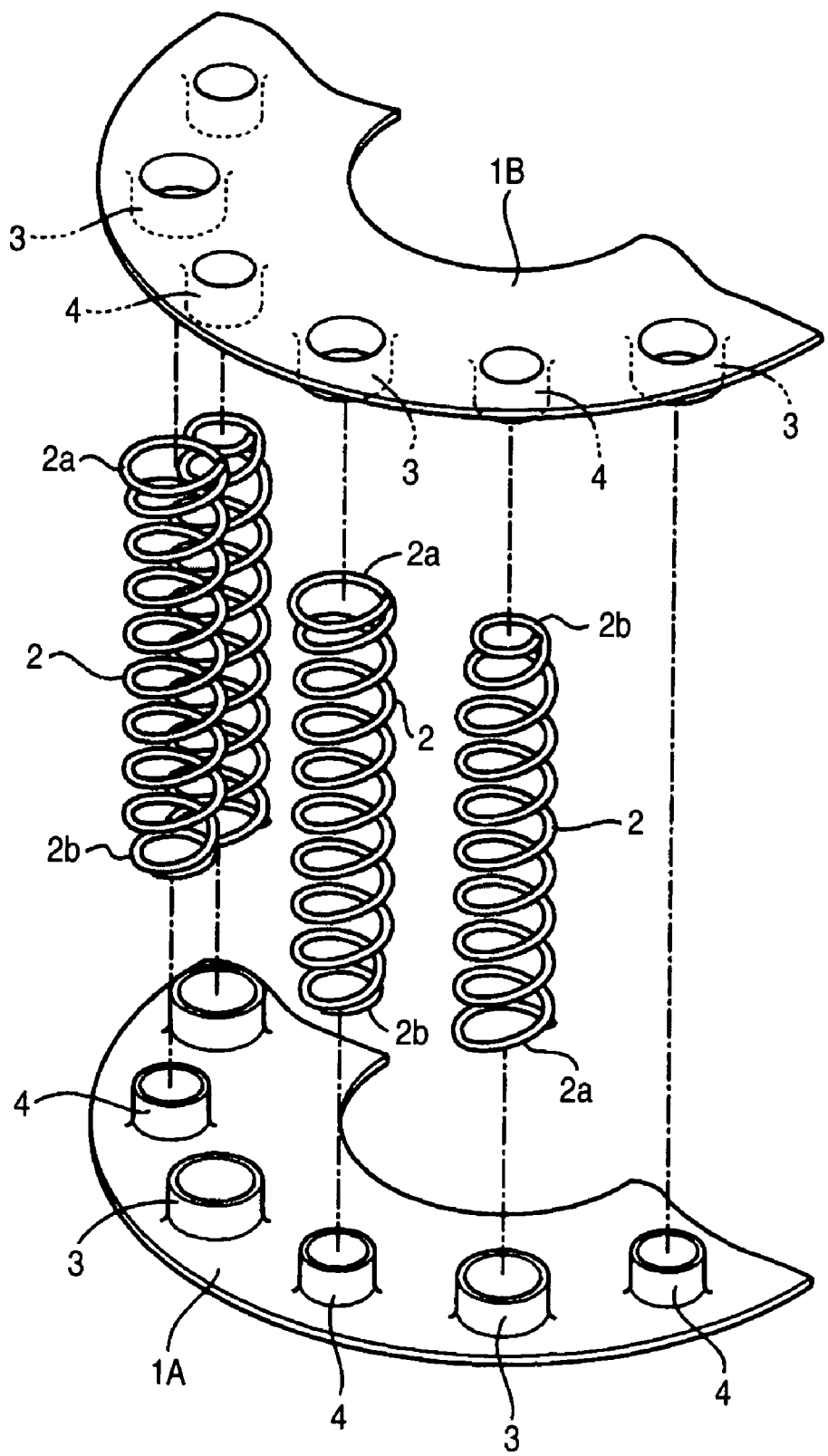
FIG. 1 is a primary-part exploded perspective view illustrating a spring assembly manufactured by a manufacturing method according to an embodiment of the invention.

Hereinafter, the invention is described in detail on the basis of a preferred embodiment thereof illustrated in the accompanying drawings. Basically, according to this embodiment, a method of manufacturing a spring assembly, which comprises two annular plates, that is, upper and lower annular plates 1A, 1B, and plural compression coil springs 2, which are arranged in the circumferential direction of each of these annular plates and interposed therebetween, similarly to the spring assembly manufactured by the related method. It is assumed that each of both end turn portions 2a and 2b of the compression coil springs 2 is surrounded between the outer peripheral surface of the projection portion 2a or 2b and the inner surface of the annular plate 1A or 1B by outwardly enlarging each of the projection portions 3, 4 formed in each of the two annular plates 1A, 1B. However, this embodiment of the invention features the following respects.

That is, first, regarding the two annular plates 1A and 1B, in the case of forming cylindrical projection portions in the inner surfaces thereof, which face each other, plural large-diameter projection portions 3 and plural small-diameter projection portions 4 are alternately formed at constant intervals one by one in each of both the annular plates 1A, 1B by performing burring processing thereon, so that the phases of the annular plates 1A, 1B are shifted from each other, and that the two annular plates 1A, 1B formed into the same shape can be shared upwardly/downwardly by opposing a set of the large-diameter projection portions 3 and the small-diameter projection portions 4 formed in one of the annular plates 1A, 1B to a set of those formed in the other annular plate.

Figure 2:
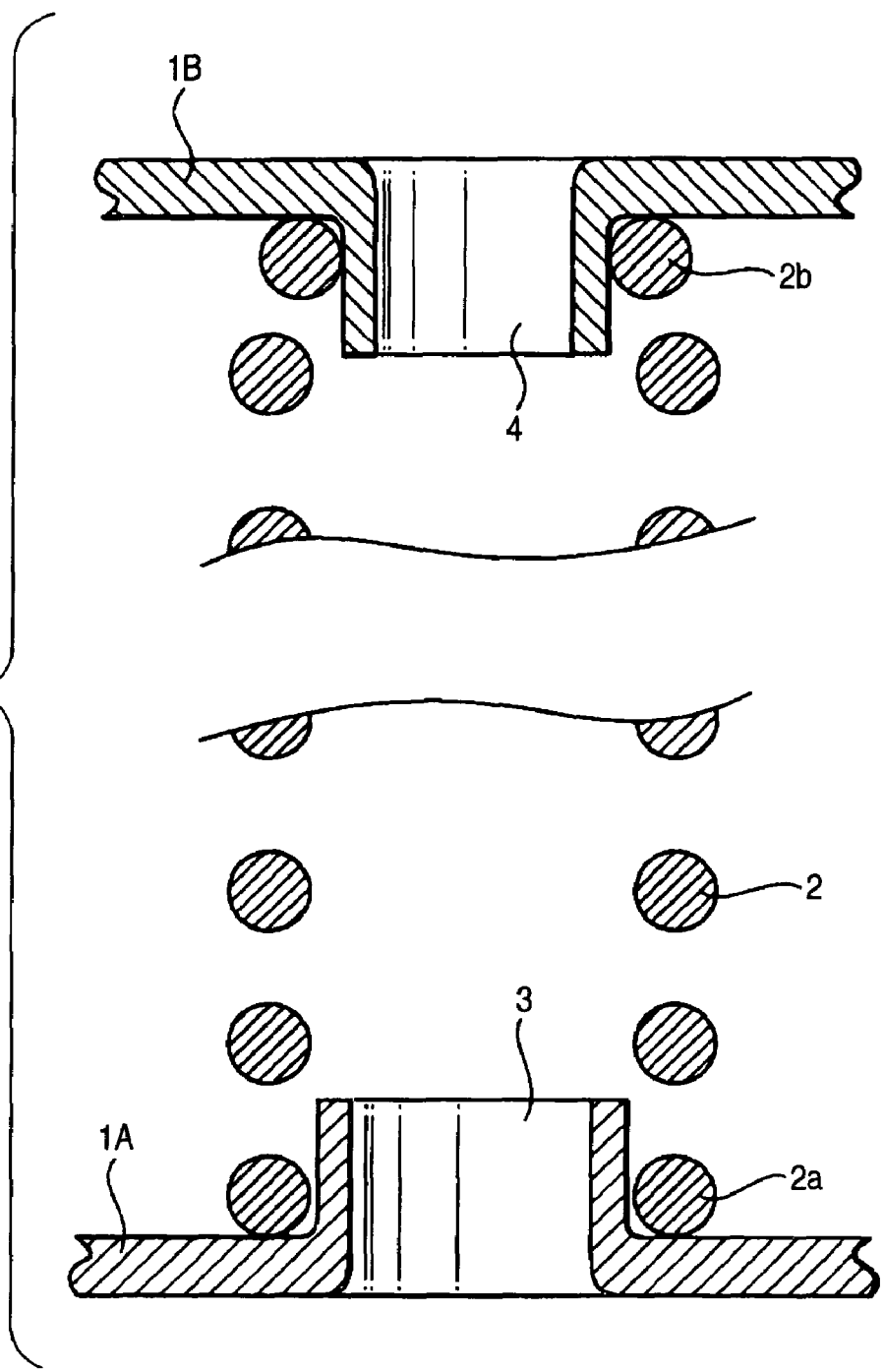
FIG. 2 is an explanatory view illustrating a state in which a large-diameter end turn portion and a small-diameter end turn portion of a compression coil spring are assembled to a large-diameter projection portion and a small-diameter projection portion of an annular plate, respectively.

Further, the plural compression coil springs 2, each of the end turn portions 2a thereof respectively associated with the large-diameter projection portions 3 formed in each of the annular plates 1A, 1B is formed into a large-diameter shape, which can be set on the outer periphery of the associated large-diameter projection portion 3. Conversely, each of the end turn portions 2b thereof respectively associated with the small-diameter projection portions 4 formed in each of the annular plates 1A, 1B is formed into a small-diameter shape, which can be set on the outer periphery of the associated large-diameter projection portion 4. Thus, as shown in FIG. 2, the large-diameter end turn portions 2a are assembled to the large-diameter projection portions 3 of each of the annular plates 1A, 1B. The small-diameter end turn portions 2b are assembled to the small-diameter projection portions 4 of each of the annular plates 1A, 1B.

Figure 3:
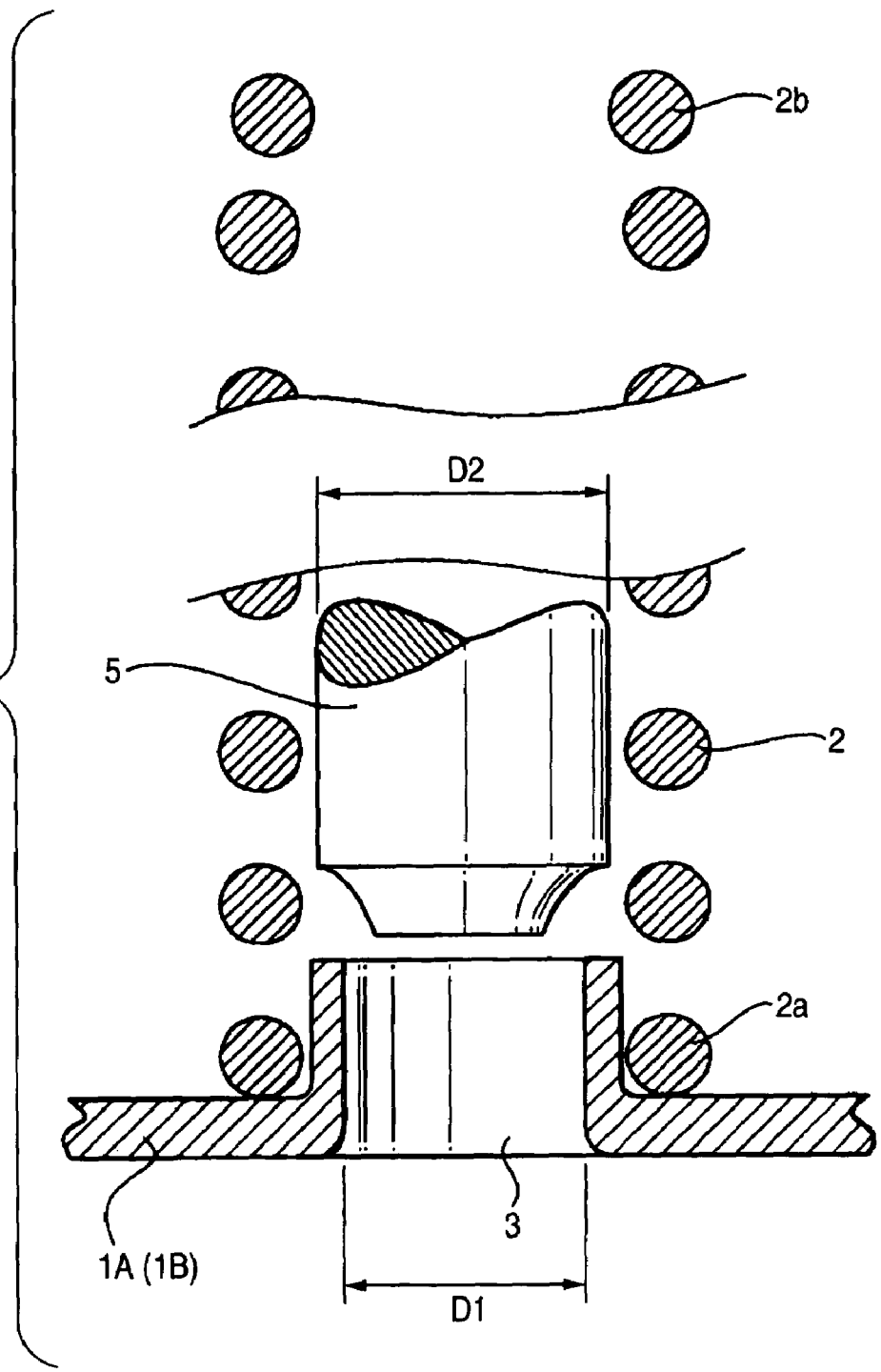
FIG. 3 is an explanatory view illustrating the process of caulking a large-diameter end turn portion of the compression coil spring portion at a large-diameter projection portion of the annular plate.
Figure 4:
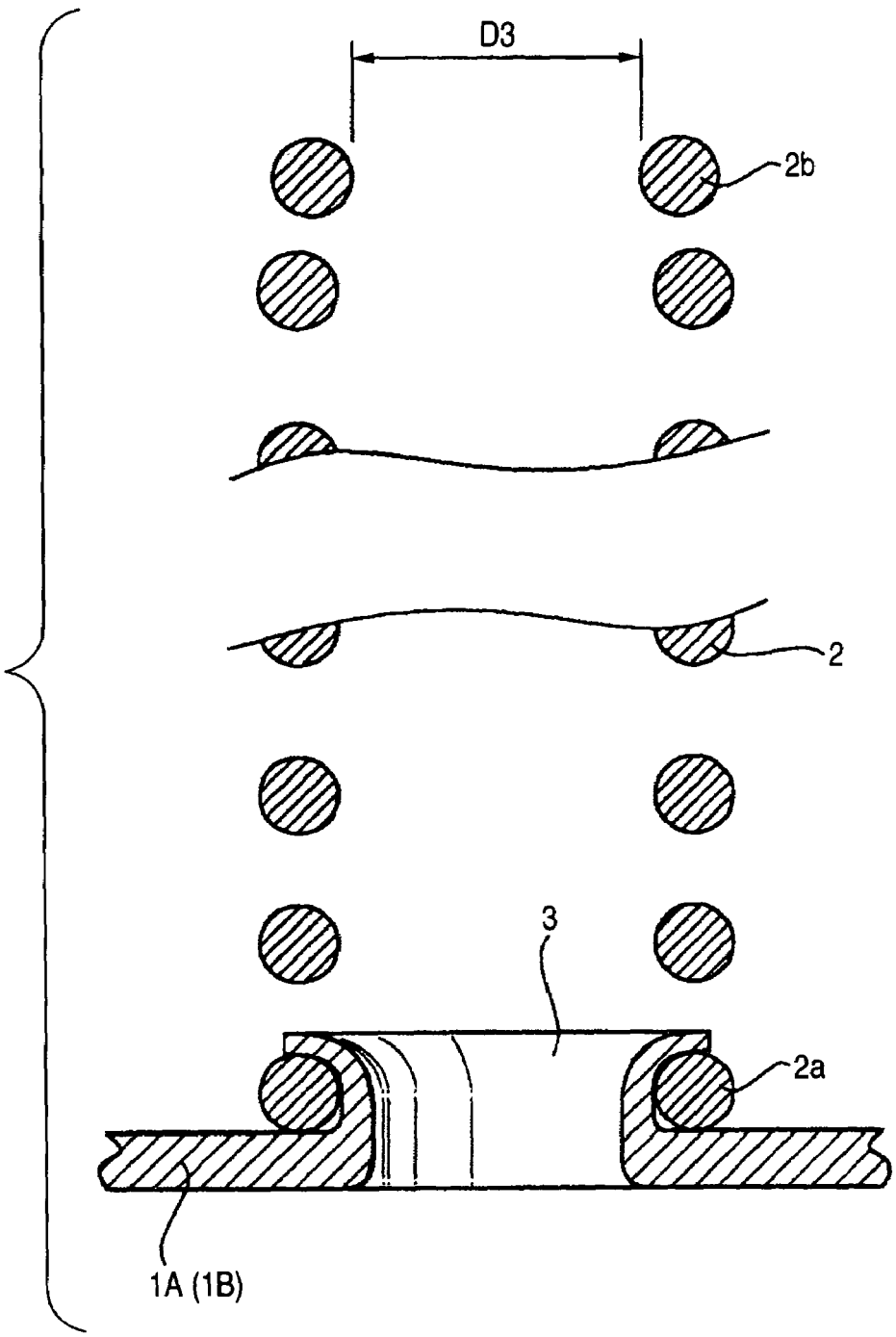
FIG. 4 is an explanatory view illustrating a state in which the large-diameter end turn portion of the compression coil spring portion is caulked at the large-diameter projection portion of the annular plate.

Thus, with such a configuration, in the case that the plural compression coil springs 2 are interposed between the two annular plates 1A, 1B, first, the large-diameter end turn portions 2a of the compression coil springs 2 are assembled to the large-diameter projection portions 3 formed in the two annular plates 1A, 1B. In this case, a state, in which the large-diameter end turn portions 2a of the compression coil springs 2 are set on the outer peripheries of the large-diameter projection portions of the annular plates 1A, 1B, as shown in FIG. 3, is obtained. Then, the punch 5 having a portion, whose diameter D2 is larger than the inside diameter D1 of each of the large-diameter projection portions 3, is inserted from the small-diameter end turn portion 2b of each of the compression coil springs 2 into the associated large-diameter projection portion 3. Subsequently, this large-diameter portion 3 is outwardly enlarged in diameter. Consequently, as shown in FIG. 4, the large-diameter end turn portion 2a of each of the compression coil springs 2 is surrounded between the outer peripheral surface of the associated large-diameter projection portion 3 and the inside surface of the associated annular plate 1A or 1B. Therefore, at that time, the following inequality holds: D1<D2. Needless to say, the diameter D2 is less than the inside diameter D3 of the small-diameter end turn portion 2b of each of the compression coil springs 2.

Figure 5:
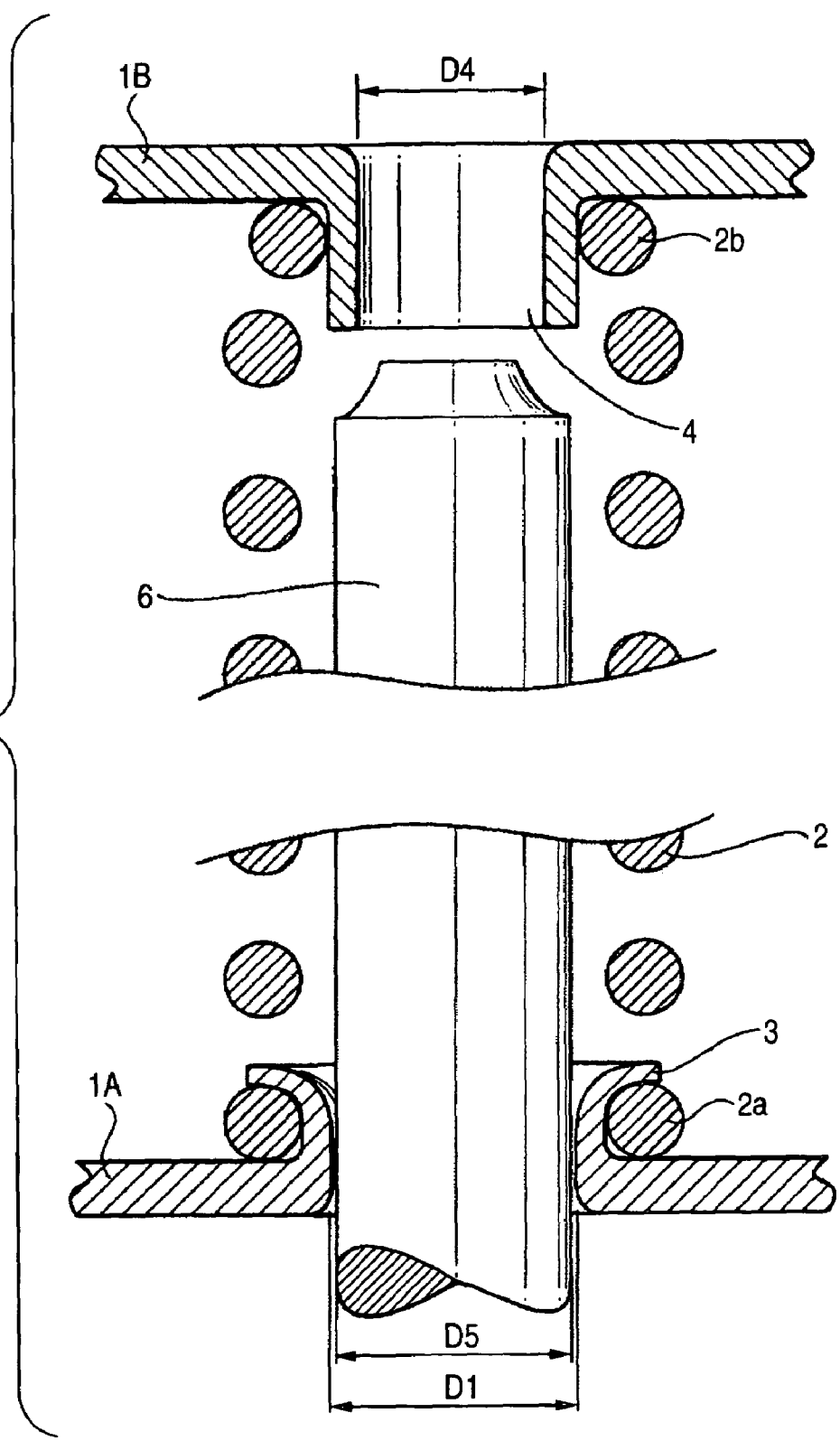
FIG. 5 is an explanatory view illustrating the process of caulking a small-diameter end turn portion of the compression coil spring portion at a small-diameter projection portion of the annular plate.

Subsequently, the small-diameter end turn portion 2b of each of the compression coil springs 2 is assembled to the associated one of the small-diameter projection portions 4 formed in the two annular plates 1A, 1B. In this case, the phase of one of the two annular plates 1A, 1B is shifted from that of the other annular plate by an amount corresponding to one projection portion, as shown in FIG. 5, so that the large-diameter projection portions 3 and the small-diameter projection portions 4 formed in the one 1A of the annular plates are set to individually face those formed in the other annular plate 1B therebetween. Thus, a state, in which the small-diameter end turn portion 2b of each of the compression coil springs 2 is set on the outer periphery of the associated small-diameter projection portion 4, is obtained. Then, a punch 6 having a portion D5, whose diameter is larger than the inside diameter D4 of each of the small-diameter projection portions 4, is used and inserted into a space in the direction of the small-diameter projection portion 4 of each of the annular plates 1A, 1B from the inside of the large-diameter projection portion 3 having already been caulked and opposed thereto. Thus, each of the small-diameter projection portions is enlarged in diameter. Consequently, as shown in FIG. 6, the small-diameter end turn portion 2b of each of the compression coil springs 2 is supported by being surrounded between the outer peripheral surface of the associated small-diameter projection portion 4 and the inner surface of the associated one of the annular plates 1A and 1B over the entire circumference thereof. Therefore, at that time, the following inequality holds: D4<D5<D1.

Incidentally, especially, in this case, when all associated punches 6 are simultaneously inserted from above or below into the inside of the already caulked large-diameter projection portions 3 of each of the annular plates 1A, 1B, the small-diameter end turn portions 2b of the compression coil springs 2 can simultaneously be assembled to the annular plates 1A, 1B, respectively. Thus, workability can extremely be enhanced.

Hence, according to this embodiment, each of the opposed large-diameter projection portions 3 and the opposed small-diameter projection portions 4 of both the annular plate 1A and the annular plate 1B can be uniformly enlarged in diameter over the entire circumference thereof. As compared with the related manufacturing method, the compression coil springs 2 can reliably and firmly be held at the side of each of the annular plates 1A and 1B. Moreover, assembling operations can greatly be simplified. Additionally, the necessity for using longitudinally split punches, which are necessary for the related manufacturing method, can be eliminated. Consequently, the durability of the caulking tools 5 and 6 is extremely enhanced.

Incidentally, in the aforementioned embodiment, the large-diameter projection portions 3 and the small-diameter projection portions 4 are alternately formed in each of the annular plates 1A and 1B one by one. However, the invention is not limited thereto. In the case where the number of compression coil springs 2 to be assembled is even, sets of plural large-diameter projection portions and sets of small-diameter projection portions may alternately be formed set by set. Alternatively, the invention is optionally practiced so that the spring assembly is manufactured by forming the large-diameter projection portions 3 in a one-side half part of each of the annular plates 1A and 1B and also forming the small-diameter projection portions 4 in the remaining half part thereof. Incidentally, the equalization of stiffness of each of the annular plates 1A and 1B can be achieved by alternately forming the large-diameter projection portions and the small-diameter projection portions.

As described above, the invention employs the aforementioned constitution. Thus, the large-diameter projection portions and the small-diameter projection portions are formed in each of the two annular plates. On the other hand, the large-diameter end turn portion, which is associated with the large-diameter projection portion, and the small-diameter end turn portion, which is associated with the small-diameter projection portion, are formed in each of the compression coil springs. Then, each of the projection portions is enlarged in diameter through the punch over the entire circumference thereof. Regarding the assembling of the large-diameter end turn portion and the small-diameter end turn portion of each of the compression coil springs to the annular plates, as compared with the related method, the end turn portions of each of the compression coil springs can reliably and firmly held. Moreover, the need for using the longitudinally split punch as used in the related method is eliminated. Consequently, the durability of a caulking tool can be enhanced very much.

What is claimed is:

1. A method of manufacturing a spring assembly, which includes two annular plates and compression coil springs, said compression coil springs being assembled to said annular plates by caulking projection portions formed on said two annular plates, respectively, the method comprising:

forming both of large-diameter projection portions and small-diameter projection portions in each of said two annular plates, while forming large-diameter end turn portions, which are respectively associated with said large-diameter projection portions, and small-diameter end turn portions, which are respectively associated with said small-diameter projection portions, in said compression coil springs;

setting the large-diameter end turn portions on outer peripheries of the large-diameter projection portions;

inserting a first punch having a portion, whose diameter is larger then an inside diameter of said large-diameter projection portions, thereinto and enlarging said large-diameter projection portions in diameter thereof to the thereby assemble said large-diameter end turn portions of said compression coil springs to said annular plates;

subsequently setting said small-diameter end turn portions on outer peripheries of said small-diameter projection portions; and inserting a second punch having a portion, whose diameter is larger than an inside diameter of said small-diameter end turn portions, from inside diameter of said large-diameter projection portions thereinto and enlarging said small-diameter projection portions in diameter thereof to thereby assemble said small-diameter end turn portions of said compression coil springs to said annular plates, wherein the large-diameter projection portions are arranged opposed to the small-diameter projection portions, and wherein the outer periphery of the large-diameter projection portions is larger than the outer periphery of the small-diameter projection portions.

2. The method of manufacturing a spring assembly according to claim 1, wherein said two annular plates comprise a same shape, and wherein said large-diameter projection portions and said small-diameter projection portions of one of said annular plates are opposed to those of the other annular plate therebetween.

3. The method of manufacturing a spring assembly according to claim 1, wherein said large-diameter projection portions and said small-diameter projection portions are alternately arranged on each of said annular plates.

4. The method of manufacturing a spring assembly according to claim 1, wherein said large-diameter projection portions and said small diameter projection portions are formed at constant intervals on each of said annular plates.

5. The method of manufacturing a spring assembly according to claim 1, further comprising:
  simultaneously inserting a plurality of punches having a portion, whose diameter is larger than an inside diameter of said large-diameter projection portions, thereinto and simultaneously enlarging each of said large-diameter projection portions in diameter thereof to thereby assemble said large-diameter end turn portions of said compression coil springs to said annular plates.

6. The method of manufacturing a spring assembly according to claim 5, further comprising:
  simultaneously inserting a plurality of second punches having a portion, whose diameter is larger than an inside diameter of said small-diameter end turn portions, from inside of each of said enlarged large-diameter projection portions thereinto and simultaneously enlarging each of said small-diarneter projection portions in diameter thereof to thereby assemble said small-diameter end turn portions of said compression coil springs to said annular plates.

7. The method of manufacturing a spring assembly according to claim 1, wherein said large-diameter projection portions and said small-diameter projection portions are uniformly enlarged.

8. The method of manufacturing a spring assembly according to claim 1, wherein said large-diameter projection portions and said small-diameter projections are formed in sets, in said annular plates.

9. The method of manufacturing a spring assembly according to claim 1, further comprising alternately forming said large-diameter projection portions and said small-diameter projection portions on each of said annular plates.

10. The method of manufacturing a spring assembly according to claim 1, wherein a small-diameter projection portion on a first annular plate is arranged opposed to a large-diameter projection portion on a second annular plate.

11. A method of manufacturing a spring assembly, which comprises two annular plates and compression coil springs, said compression coil springs being assembled to said annular plates by caulking projections formed on said two annular plates, respectively, the method comprising:
  forming a first set caulking projections having a first diameter and forming a second set of caulking projections having a second diameter, which is different from said first diameter, in each of said annular plates;
  forming, in said compression coil springs, a first end turn portion having a first diameter and a second end turn portion having a second diameter, which is different from said first diameter;
  setting said first end turn portion on an outer periphery of said first set of caulking projections and said second end turn portion on an outer periphery of second set of caulking projections; and
  enlarging said first diameter of said first set of caulking portions and enlarging said second diameter of said second set of caulking portions to assemble said compression coil springs to said annular plates,
  wherein the first set of caulking projections arc arranged opposed to the second set of caulking projection, and
  wherein the outer periphery of first set of caulking projections is different from the outer periphery of the second set of caulking projections.

12. The method of manufacturing a spring assembly according to claim 11, wherein said first set of caulking projections and said second set of caulking projections arc arranged alternately on each of said annular plates.

13. The method of manufhcturing a spring assembly according to claim 11, wherein said first set of caulking projections and said second set of caulking projections are arranged at constant intervals on said annular plates.

14. The method of manufacturing a spring assembly according to claim 11, wherein a caulking projection from said first set of caulking projections on a first annular plate is arranged opposed to a caulking projection from said second set of caulking projections on a second annular plate.

15. A spring assembly, comprising:
  two annular plates; and
  compression coil springs assembled to said annular plates by caulking projections formed on said two annular plates, said caulking projections comprising:
    a first set of caulking projections, in each of said two annular plates, having a first diameter; and
    a second set of caulking projections, in each of said two annular plates, having a second diameter, which is different from said first diameter,
    wherein said compression coil springs comprise a first end turn portion having a first diameter and a second end turn portion having a second diameter, which is different from said first diameter, said first end turn portion being set on an outer periphery of said first set of caulking projections and said second end turn portion on an outer periphery of said second set of caulking projections wherein the first set of caulking projections are arranged opposed to the second set of caulking projection, and
  wherein the outer periphery of the first set of caulking projections is different from the outer periphery of the second set of caulking projections.

16. The spring assembly according to claim 15, wherein said first set of caulking projections and said second set of caulking projections are arranged alternately on each of said annular plates.

17. The spring assembly according to claim 15, wherein said first set of caulking projections and said second set of caulking projections are arranged at constant intervals on said annular plates.

18. The spring assembly according to claim 15, wherein a caulking projection from said first set of caulking projections on a first annular plate is arranged opposed to a caulking projection from said second set of caulking projections on a second annular plate.

* * * * *